July 6, 1937.  J. BEAVAN  2,086,113
EMERGENCY BRAKE APPARATUS FOR MOTOR ROAD VEHICLES
Filed Jan. 30, 1937
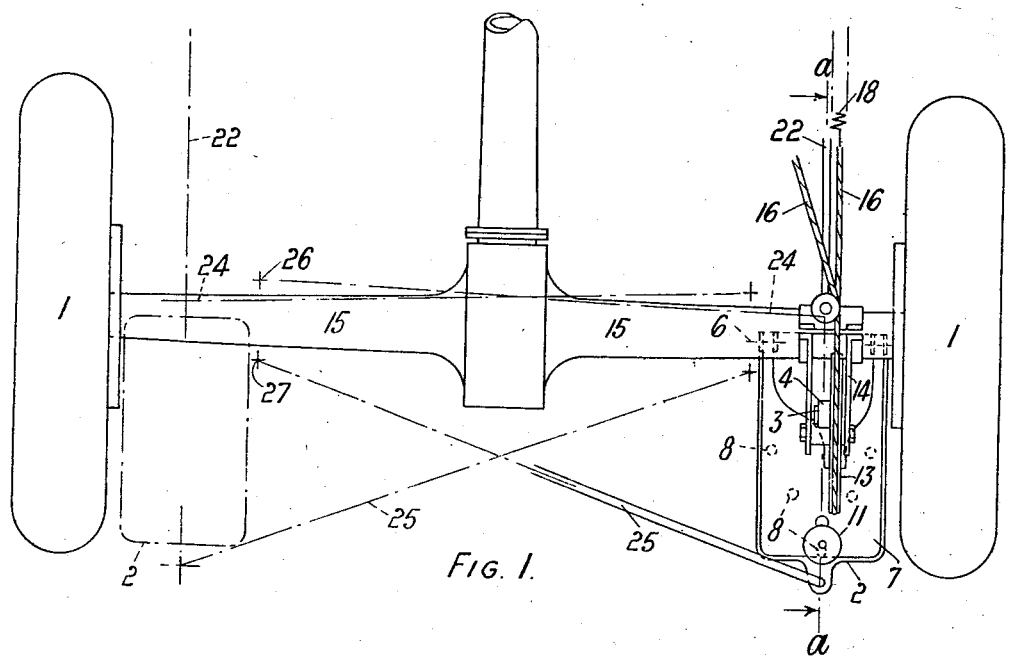
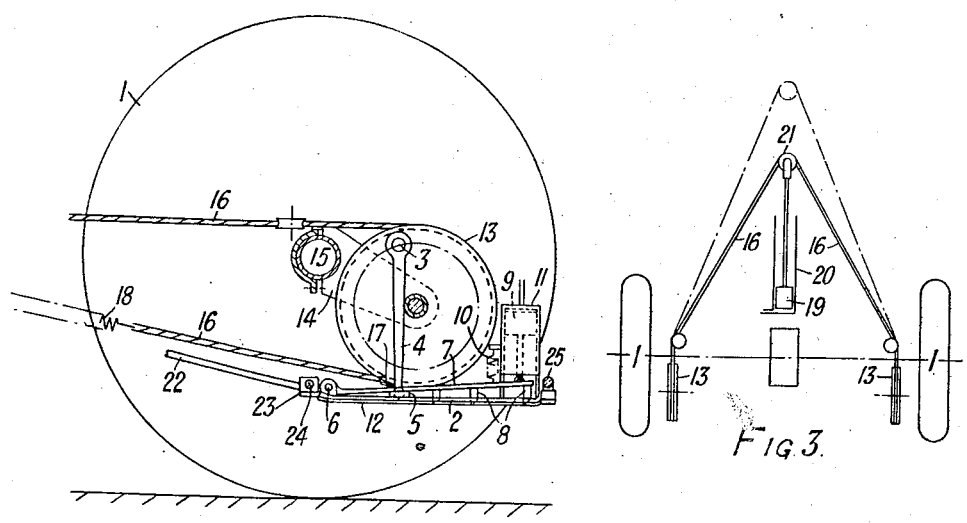

Patented July 6, 1937

2,086,113

UNITED STATES PATENT OFFICE 2,086,113

EMERGENCY BRAKE APPARATUS FOR MOTOR ROAD VEHICLES

John Beavan, Ayr, Scotland

Application January 30, 1937, Serial No. 123,108
In Great Britain September 18, 1935

2 Claims. (Cl. 188—5)

The subject of this invention is an emergency brake apparatus for motor road vehicles of the kind including at least one vertically movable brake shoe operatively connected to a power-driven crank and engageable with the road under the control of the driver.

The invention provides, inter alia, a shoe for such apparatus including a plurality of spikes which are movable into and out of engagement with the road, independently of the shoe, while the shoe is in engagement with the road.

An emergency brake apparatus constructed in accordance with the invention is illustrated diagrammatically in the accompanying drawing in which Fig. 1 is a plan view, Fig. 2 a part elevation part vertical section on the line a—a of Fig. 1, and Fig. 3 a plan view drawn to a smaller scale.

One brake shoe only and its crank mechanism are detailed in the drawing, but it will be understood that these parts, in the construction shown, are provided at each side of the vehicle, adjacent to each rear road wheel.

As shown, there is mounted adjacent to each rear road wheel 1 of a vehicle a vertically movable brake shoe 2 operatively connected to a power-driven crank 3 and engageable with the road under the control of the driver of the vehicle. Each shoe 2 is connected to its crank 3 by a connecting rod 4 having a ball-and-socket connection 5 at its lower end with the shoe. Hinged at 6 to the forward end of each shoe 2 is a top plate 7 presenting a plurality of downwardly-projecting spikes 8 which are disposed in register with holes in the associated shoe 2 and which are engageable with the road, while the shoe is in engagement with the road, by actuation of a pneumatic piston 9 to depress the plate 7 upon the shoe 2 in opposition to the action of a spring 10. The piston 9 works in a cylinder 11 supported by the shoe 2 and connectible to a source of compressed air or other gas, under the control of the driver. The plate 7 is apertured or cut away for passage of the connecting rod 4 to the shoe 2.

The shoe 2 is armed on its underside with bonded asbestos 12 or other friction material.

The crank 3 is carried by a pulley 13 journalled in a forked bracket 14 attached to the rear axle casing 15. Each pulley 13 is wrapped by a rope 16 attached to the pulley at 17 and leading from a tension spring anchorage 18, around the pulley 13, to a common actuator in the form of a piston 19 working in a cylinder 20 connectible to a source of compressed air or other gas under the control of the driver. The ropes 16 from both pulleys 13 are continuous and are trained around a pulley 21 which is guided for displacement longitudinally of the vehicle, under the action of the piston 19, the arrangement permitting compensating motion of the shoes.

Each shoe is connected to the chassis frame of the vehicle by a tie rod 22 having a ball-and-socket connection 23 with the forward end of the shoe. Each shoe is also stayed transversely by a pair of transverse stay rods 24, 25 which also have ball-and-socket connections with opposite ends of the shoe and which extend from the respective shoe to ball-and-socket anchorage points 26, 27 on the axle casing 15.

As will be understood, in operation, when compressed air is admitted to the cylinder 20, the movement of the piston 19 is transmitted through the ropes 16 to the pulleys 13 which are constrained to rotate through approximately half a revolution, whereby the shoes 2 are lowered and forced into engagement with the road. In their fully lowered position the shoes 2 force the wheels 1 clear of the road, the cranks 3 being located at or near their bottom dead-centre position. If, now, compressed air is admitted to the cylinders 11 the spikes 8 will be forced into engagement with the road. To restore the shoes 2 to inoperative position the cylinder 20 is connected to exhaust, when the apparatus is actuated reversely under the tension of the springs 18.

I claim:—

1. An emergency brake apparatus for motor road vehicles comprising, in combination, at least one vertically movable brake shoe mounted on a vehicle and engageable with the road under the control of the driver, a power-driven crank connected to said shoe, and a plurality of spikes passing through said shoe and movable into and out of engagement with the road, independently of said shoe, while said shoe is in engagement with the road.

2. An emergency brake apparatus for motor road vehicles comprising, in combination, two vertically movable brake shoes located one on each side of the vehicle at the rear thereof and engageable with the road by power-operated means under the control of the driver, a plurality of spikes passing through said shoes and movable into and out of engagement with the road independently of said shoes while said shoes are in engagement with the road, said power-operated means including a pressure fluid operated piston so connected to said shoes as to provide for differential movement of said shoes.

JOHN BEAVAN.